(12) United States Patent
Brunnett et al.

(10) Patent No.: US 6,924,952 B1
(45) Date of Patent: Aug. 2, 2005

(54) METHOD AND APPARATUS FOR DATA STORAGE IN A DISK DRIVE

(75) Inventors: Don Brunnett, Pleasanton, CA (US); Uwe Schwiegelshohn, Herdecke (DE); Steve McCarthy, Mead, CO (US)

(73) Assignee: Maxtor Corporation, Longmont, CO (US)

( * ) Notice: Subject to any disclaimer, the term of this patent is extended or adjusted under 35 U.S.C. 154(b) by 369 days.

(21) Appl. No.: 09/923,910

(22) Filed: Aug. 6, 2001

Related U.S. Application Data

(60) Provisional application No. 60/222,858, filed on Aug. 4, 2000.

(51) Int. Cl.[7] .............................................. G11B 5/09
(52) U.S. Cl. ...................................................... 360/48
(58) Field of Search ....................... 360/40, 48; 341/50; 711/113, 136, 111, 126; 714/769; 710/32, 52, 62, 65–66, 72, 74

(56) References Cited

U.S. PATENT DOCUMENTS

| | | | | |
|---|---|---|---|---|
| 5,420,998 A | * | 5/1995 | Horning | 711/113 |
| 5,715,424 A | * | 2/1998 | Jesionowski et al. | 714/24 |
| 5,751,512 A | | 5/1998 | Anderson | 360/78.04 |
| 5,765,193 A | * | 6/1998 | Rosich et al. | 711/136 |
| 5,812,335 A | * | 9/1998 | Kool et al. | 360/51 |
| 6,115,787 A | * | 9/2000 | Obara | 711/113 |
| 6,289,484 B1 | * | 9/2001 | Rothberg et al. | 714/769 |
| 6,320,718 B1 | | 11/2001 | Bouwkamp et al. | 360/77.04 |
| 6,324,604 B1 | * | 11/2001 | Don et al. | 710/74 |
| 6,646,823 B1 | | 11/2003 | Brunnett | 360/48 |

* cited by examiner

*Primary Examiner*—David Hudspeth
*Assistant Examiner*—Jason Olson
(74) *Attorney, Agent, or Firm*—Tejpal S. Hansra (57) ABSTRACT

A method and apparatus for increasing formatting efficiency of a disk drive is disclosed. In one embodiment, a method for storing data in a disk drive is provided. The disk drive is coupled to a computer via an interface. The method includes the steps of storing data on a disk surface in a disk block having a predetermined length; and, presenting data from the disk drive to the interface as a host block having a predetermined length, wherein the predetermined length of the disk block is equal to N times the predetermined length of the host block, where N is a natural number greater than 1. In one embodiment, a read/modify/write procedure is provided to ensure that data is not lost when a power failure occurs during a write operation when the number of host blocks being written is not a multiple of N.

57 Claims, 4 Drawing Sheets

METHOD AND APPARATUS FOR DATA STORAGE IN A DISK DRIVE

CROSS-REFERENCE TO RELATED APPLICATION

Priority is claimed from U.S. Provisional Patent Application Ser. No. 60/222,858 filed Aug. 4, 2000, which is incorporated by reference herein in its entirety.

INCORPORATION BY REFERENCE

U.S. patent application Ser. No. 09/590,047 filed Jun. 8, 2000 is also incorporated herein by reference in its entirety.

FIELD OF THE INVENTION

The present invention relates to a method and apparatus for data storage in a disk drive. More particularly, the present invention relates to a method and apparatus for increasing formatting efficiency of a disk drive.

BACKGROUND OF THE INVENTION

Figure 1:
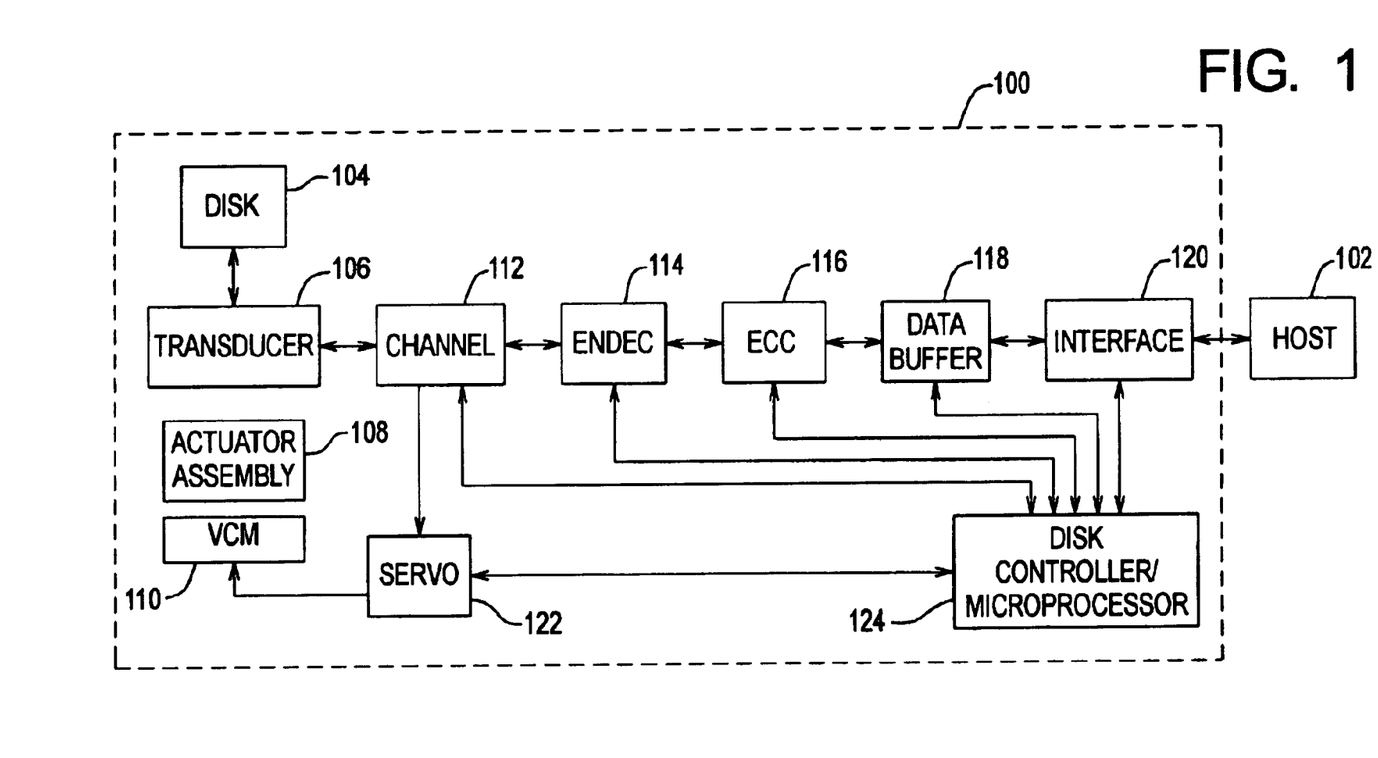
FIG. 1 is a block diagram showing certain functional components of a conventional disk drive, wherein the disk drive is coupled to a host computer.

FIG. 1 illustrates a conventional disk drive system 100. The disk drive system 100 is operative for performing data storage and retrieval functions for an external host computer 102. The disk drive system 100 includes: a disk 104, a transducer 106, an actuator assembly 108, a voice coil motor (VCM) 110, a read/write channel 112, an encoder/decoder (ENDEC) 114, an error correction coding (ECC) unit 116, a data buffer memory 118, an interface unit 120, a servo unit 122, and a disk controller/microprocessor 124.

Figure 2:
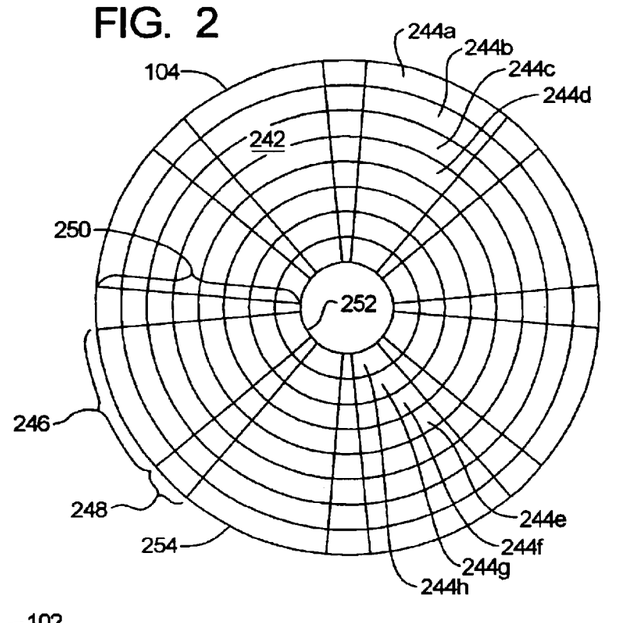
FIG. 2 is a diagrammatic representation of a simplified top view of a disk having a surface which has been formatted to be used in conjunction with a conventional sectored servo system.

In general, disk 104 includes a pair of disk surfaces (a disk surface 242 is shown in FIG. 2) which are coated with a magnetic material that is capable of changing its magnetic orientation in response to an applied magnetic field. Data is stored digitally in the form of magnetic polarity transitions (frequently referred to as pulses) within concentric tracks on one or more of the disk surfaces. The disk 104 is rotated at a substantially constant spin rate by a spin motor (not shown) that is speed-controlled by a closed-loop feedback system. Instead of the single disk 104 shown in FIG. 1, the disk drive system 100 can include a plurality of disks all mounted on a single spindle and each serviced by one or more separate transducers.

The transducer 106 is a device that transfers information from/to the disk 104 during read and write operations. The transducer 106 is positioned over the disk 104, typically, by a rotary actuator assembly 108 that pivots about an axis under the power of the VCM 110. During a write operation, a polarity-switchable write current is delivered to the transducer 106 from the read/write channel 112 to induce magnetic polarity transitions onto a desired track of the disk 104. During a read operation, the transducer 106 senses magnetic polarity transitions on a desired track of the disk 104 to create an analog read signal that is indicative of the data stored thereon. Commonly, the transducer 106 is a dual element head having a magnetoresistive read element (or giant magnetoresistive read element) and an inductive write element.

The VCM 110 receives movement commands from the servo unit 122 for properly positioning the transducer 106 above a desired track of the disk 104 during read and write operations. The servo unit 122 is part of a feedback loop that uses servo information from the surface of the disk 104 to control the movement of the transducer 106 and the actuator assembly 108 in response to commands from the controller/microprocessor 124.

During a read operation, the channel 112 receives the analog read signal from the transducer 106 and processes the signal to create a digital read signal representative of the data stored on the disk 104. Typically, detection circuitry is included in the channel 112. The channel 112 may also include means for deriving timing information, such as a read clock, from the analog signal.

The ENDEC 114 is operative for: (1) encoding data being transferred from the host 102 to the disk 104, and (2) decoding data being transferred from the disk 104 to the host 102. Data being written to the disk 104 is encoded for a number of reasons, including those relating to timing and detection concerns. The ENDEC generally imparts a run length, limited (RLL) code on the data being written to the disk 104 to ensure that the frequency of transitions in the bit stream does not exceed or fall below predetermined limits. Such coding ensures that, among other things, enough transitions exist in the read data to maintain an accurate read clock. Other coding schemes may also be employed in the ENDEC 114.

The ECC unit 116 is operative for adding redundant information to the data from the host 102 before that data is encoded in the ENDEC 114 and written to the disk 104. This redundant information is used during subsequent read operations to permit discovery of error locations and values within the decoded read data. Errors in the read data detected by the ECC unit 116 can result from any number of mechanisms, such as: (1) media noise due to media anomalies, (2) random noise from the transducer, cabling and electronics, (3) poor transducer placement, which reduces signal amplitude and/or increases adjacent track noise during the read operation, (4) poorly written data due to media defects or poor transducer placement, and/or (5) foreign matter on the media or media damage. ECC units are generally capable of correcting up to a predetermined number of errors in a data block. If more than the predetermined number of errors exist, then the code will not be able to correct the errors but may still be able to identify that errors exist within the block. ECC functionality is generally implemented in a combination of hardware and software.

The data buffer memory 118 is used to temporarily store data for several purposes: (1) to permit data rates that are different between the disk drive and the host interface bus, (2) to allow time for the ECC system to correct data errors before data is sent to the host 102, (3) temporary parameter storage for the controller/microprocessor 124, and (4) for data caching.

The interface 120 is used to establish and maintain communication between the host 102 and the disk drive system 100. In this regard, all transfer of information into and out of the disk drive 100 takes place through the interface 120.

The disk controller/microprocessor 124 is operative for controlling the operation and timing of the other elements of the system 100. In addition, the controller/microprocessor 124 may perform the functions of some of the elements of the system. For example, the controller/microprocessor 124 may perform the correction computation function of the ECC unit 116 if errors exceed the capability of the hardware based unit.

FIG. 2 is a diagrammatic representation of a simplified top view of a disk 104 having a surface 242 which has been formatted to be used in conjunction with a conventional sectored servo system (also known as an embedded servo system), as will be understood by those skilled in the art. As illustrated in FIG. 2, the disk 104 includes a plurality of concentric tracks 244a–244h for storing data on the disk's surface 242. Although FIG. 2 only shows a relatively small number of tracks (i.e., 8) for ease of illustration, it should be appreciated that typically many thousands of tracks are included on the surface 242 of a disk 104.

Each track 244a–244h is divided into a plurality of data sectors 246 and a plurality of servo sectors 248. The servo sectors 248 in each track are radially aligned with servo sectors 248 in the other tracks, thereby forming servo wedges 250 which extend radially across the disk 104 (e.g., from the disk's inner diameter 252 to its outer diameter 254). The servo sectors 248 are used to position the transducer 106 associated with each disk 104 during operation of the disk drive 100. The data sectors 246 are used to store customer data, which is provided by the host computer 102.

Figure 3:
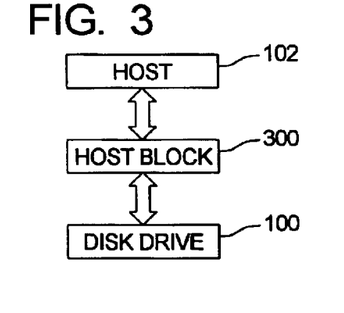
FIG. 3 is a block diagram showing that data is communicated between a host computer and a disk drive in host blocks having a predetermined length.

As mentioned above, all information is transferred into and out of the disk drive 100 to the host 102 via interface 120. As depicted in FIG. 3, conventionally, data is transferred from the host computer 102 to the disk drive 100 in fixed data sizes known as host blocks 300. Typically, a host block 300 ranges in length from 128 bytes to 4096 bytes, with 512 bytes being most common.

Figure 4:
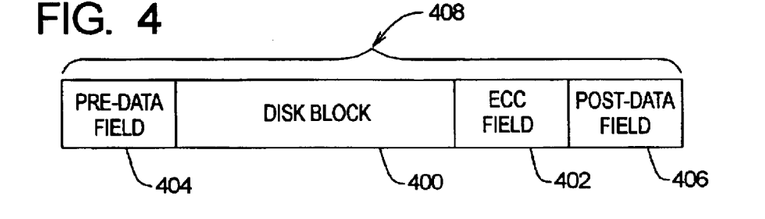
FIG. 4 is a block diagram of a disk sector comprised of a pre-data field, a disk block, an ECC field and a post-data field.

With reference to FIG. 4, conventionally, data is stored onto the surface 242 of disk 104 in fixed data sizes known as disk blocks 400. As shown in FIG. 4, each disk block 400 has an error correction (ECC) field 402 associated with it. Furthermore, in order to store and retrieve a disk block 400 onto the disk surface 242, a pre-data field 404 and a post-data field 406 are typically provided for each disk block 400. The combined pre-data field 404, disk block 400, ECC field 402 and post-data field 406 comprise a disk sector 408, which is stored on the disk surface 242 in a data sector 246. The formatting efficiency of a disk drive 100 may be defined as the length of the disk block 400 divided by the total disk sector length 408.

As will be understood by those skilled in the art, there are a number of types of interfaces that may be employed for communicating data between the host computer 102 and the disk drive 100. These interfaces may include, for example, an advanced technology attachment (ATA) interface (also known as an integrated device electronics (IDE) interface), small computer system interface (SCSI), a fiber channel (FC) interface, a gigabit interconnect (GBIC) interface and a peripheral component interconnect (PCI) interface, among others. The length of the host block 300 is determined by the particular interface that is used.

In some interfaces, the size of the host block 300 is fixed. For, example, IDE interfaces require the host block 300 to have a length of 512 bytes. Other interfaces, however, (e.g., SCSI and FC interface) support host blocks 300 having variable lengths. In such interfaces, the length of the host block 300 may be programmed by a user.

Regardless of the interface that is used and regardless of the length of the host block 300, there has generally been a one-to-one correlation between the size of the host block 300 and the size of the disk block 400. That is, if the size of the host block 300 is set to be 512 bytes, the size of the disk block 400 is 512 bytes; or, if the size of the host block is set to be 4096 bytes, the size of the disk block is 4096 bytes.

Notably, there have been disk drive systems which have provided disk block sizes which are smaller than host block sizes (e.g., two or more disk blocks map to a single host block). However, such systems are generally frowned upon, since additional ECC fields are required for such systems. For example, in one case, the size of a host block may be 4096 bytes, while the size of the disk block may be 1024 bytes. In such case, the host block is divided into four disk blocks. With reference again to FIG. 4, each of the four disk blocks would have a pre-data field 404, ECC field 402 and post-data field 406 associated with it. Accordingly, the overhead of the disk drive system would be increased, as compared to systems where there is a one-to-one correlation between the size of the host block 300 and the size of the disk block 400.

As mentioned above, the ECC performs a variety of functions. For example, the ECC may be used to correct for thermal asperities. A thermal asperity occurs, for example, when the transducer 106 strikes a particle on the disk surface 242, which causes a thermal event that makes data stored on the disk surface 242 unreadable for a period of time. Furthermore, the ECC may be used to correct random errors.

Because data rates are increasing, the amount of ECC necessary to be appended to each disk block 400 for purposes of thermal asperity correction has been increasing. In addition, as real densities increase, the bit error rate increases. Thus, the amount of ECC required to be appended to each disk block 400 for purposes of correcting random errors has been increasing. Accordingly, the overall formatting efficiency of disk drives has been decreasing.

Therefore, it would be desirable to develop a method and apparatus for increasing a disk drive's formatting efficiency, while maintaining (or increasing) the error correction capabilities of the drive, without having to modify the interface between the disk drive and the host computer.

SUMMARY OF THE INVENTION

The present invention is designed to minimize the aforementioned problems and meet the aforementioned, and other, needs.

To increase the format efficiency in a disk drive, a disk block is provided that has a length equal to the length of N host blocks, where N is a natural number greater than 1. Thus, N host blocks are appended to one another to comprise a disk block. A single ECC field, instead of N ECC fields, (albeit slightly longer than an ECC field for one host block) may be provided for the N host blocks, thereby reducing the overhead associated with the disk surface and increasing the format efficiency of the disk drive.

A read/modify/write procedure is also provided to ensure that data is not lost when a power failure occurs during a write operation when the number of host blocks being written is not a multiple of N. In conjunction with one embodiment of the read/modify/write procedure, one or more safety sectors are provided to redundantly store one or more disk sectors that include one or more host blocks of data that are not to be modified.

Other objects, features, embodiments and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

In conceiving of the present invention, the inventors have made a number of observations, some of which are listed below. Specifically, the inventors have recognized that thermal asperities are relatively rare events. Therefore, the likelihood of having consecutive data sectors with a thermal asperity is extremely small. Furthermore, the inventors have recognized that if two or more host blocks were appended to one another to form a larger-than-conventional disk block (e.g., if four host blocks, each having a length of 512 bytes, were appended to one another to form a disk block having 2048 bytes), only a slightly longer ECC would be required to correct for thermal asperities, as compared to a conventional disk block (e.g., a disk block having a length of 512 bytes). Accordingly, the overall amount of space occupied by the ECC, as compared to conventional systems, is reduced. Thus, the format efficiency of the disk drive may be increased, thereby allowing more data to be stored on the disk surface.

Figure 5:
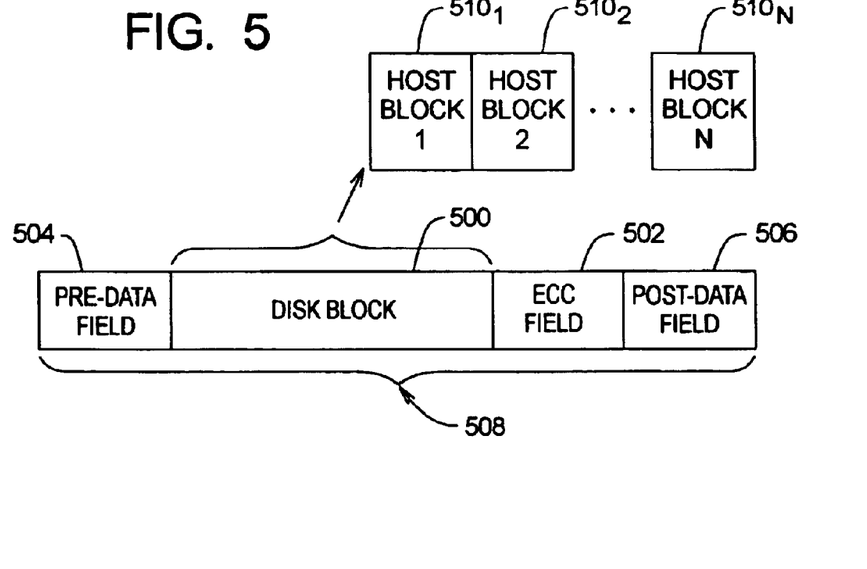
FIG. 5 is a block diagram which illustrates a disk sector in accordance with the present invention.

FIG. 5 is a block diagram which illustrates a disk sector 508 in accordance with the present invention. The disk sector 508 is comprised of a disk block 500, an ECC field 502 appended to the data block 500, a pre-data field 504 and a post-data field 506.

Instead of a one-to-one correlation existing between each host block and each disk block, N host blocks 510 are mapped to a single disk block 500, where N is a natural number greater than 1. Furthermore, because a one-to-one correlation does not exist between the number of host blocks 510 and each of: (1) the number of pre-data fields 504, (2) the number of post-data fields 506 and (3) the number of ECC fields 502, the format efficiency of the disk drive is increased. By slightly increasing the length of the ECC field 502 corresponding with each disk block 500 (as compared to a conventional disk drive), the disk drive's thermal asperity error correction capabilities will also be increased.

In the present invention, when the host computer 100 requests data from the disk drive 102, the particular disk block 500 containing the data to be retrieved is cached in the data buffer 118 (after decoding and ECC operations have been performed). The data is then parsed and delivered to the host computer 102 via interface 120 in sizes corresponding to that of a host block 510. If less than all of the host blocks 510 which form the disk block 500 are requested by the host computer 102, then only the cached data corresponding to the requested host blocks 510 is transferred (again, in sizes corresponding to a host block).

When the host computer 102 is desirous of storing N (or a multiple of N) host blocks 510 onto the disk surface 242, the process is relatively straightforward. Each of the host blocks 510 are individually transferred to the disk drive 100 via interface 120 and stored in the data buffer 118. When N host blocks 510 have been transferred, the disk block 500 is stored in a data sector 246 (after appropriate processing).

Figure 6:
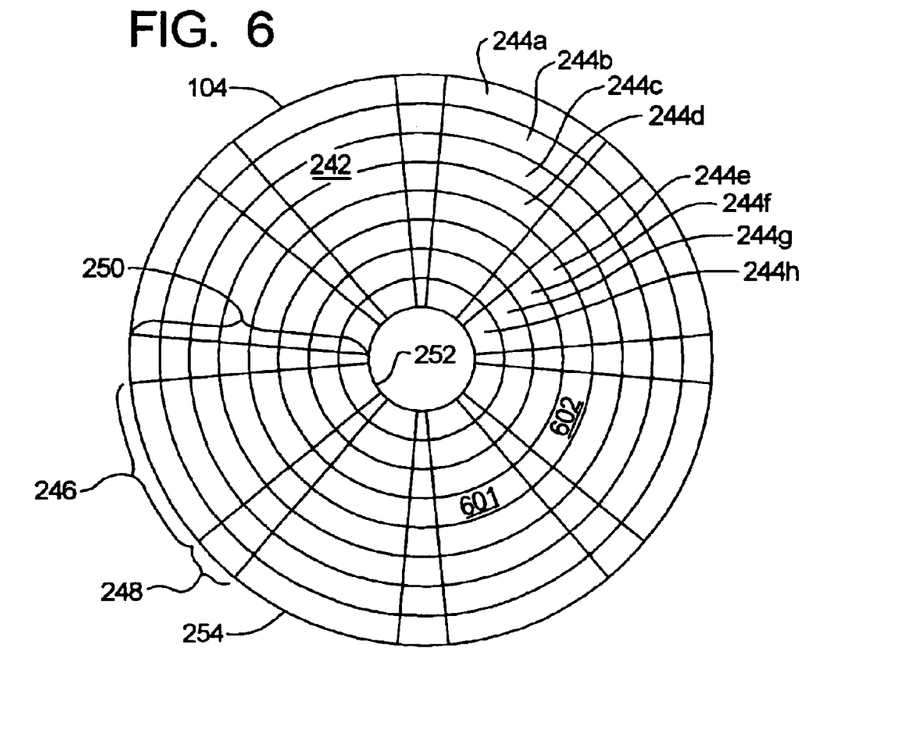
FIG. 6 is a diagrammatic representation, similar to that shown in FIG. 2, except that the disk surface includes first and second safety sectors, which may be used in conjunction with the present invention; and, FIG. 7 is a flowchart which illustrates one embodiment of implementing the read/modify/write technique of the present invention.
Figure 7:
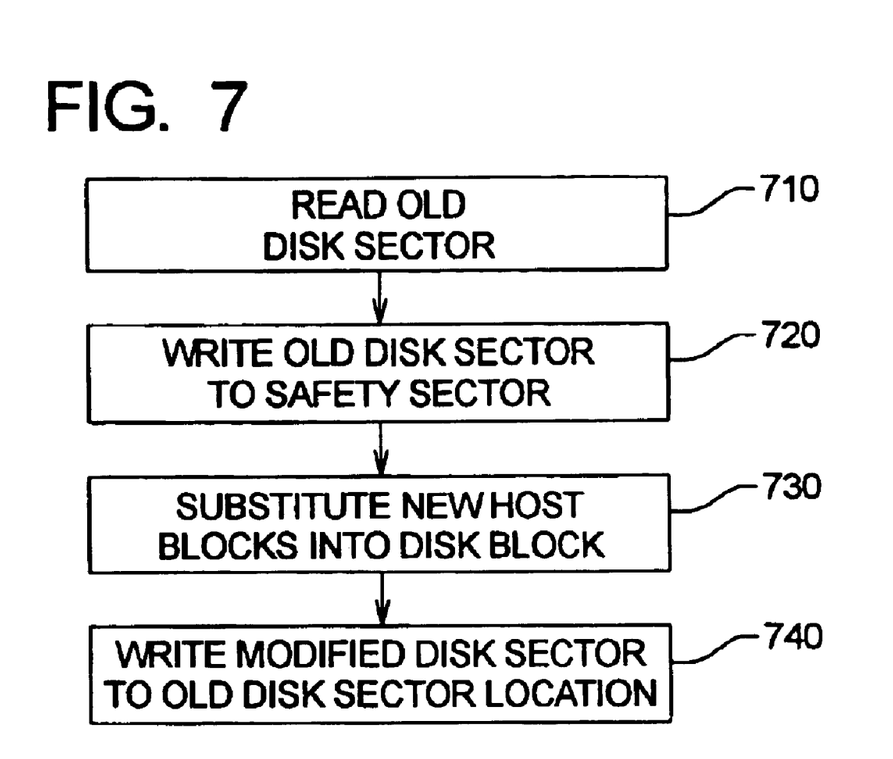

A special problem arises, however, when the host computer 102 is desirous of storing host blocks 510 which are not a multiple of N. Since, in such case, there will be a disk block 500 which will only be partially overwritten, it is necessary to provide a technique (named "read/modify/write" by the inventors) that will ensure that data, which is not to be overwritten, remains in tact in the event of a power failure. Reference will be made to FIGS. 6 and 7 to describe one embodiment of a read/modify/write technique.

FIG. 6 is a diagrammatic representation, similar to that shown in FIG. 2, except that the disk surface 242 includes first and second safety sectors 601, 602, which may be used in conjunction with the present invention. In the description that follows, only first safety sector 601 is used, although both first and second safety sectors 601, 602 may be used.

FIG. 7 is a flowchart which illustrates one embodiment of implementing the read/modify/write technique of the present invention. Referring to FIG. 7, first, the old disk sector 508 (i.e., the disk sector which is to be modified) is read and stored in the data buffer 118 (block 710). Next, a copy of the old disk sector 508 is stored in a safety sector (e.g., first safety sector 601) (block 720). When writing the old disk sector 508 to safety sector 601, an identifier is also written (using conventional techniques) that indicates the original location of the old disk sector 508. In one embodiment, the identifier may include the logical block address that corresponds to the original location of the old disk sector.

Subsequently, in the data buffer 118, the new host blocks 510 are substituted for the old host blocks 510 (i.e., the host blocks are being overwritten) (block 730). Next, the modified disk sector 508, which contains the new host blocks 510, is written to the location of the old disk sector 508 (block 740).

If a power failure occurs before the modified disk sector 508 has been written to the old disk sector 508 location, then the unmodified portion of the disk sector 508 (i.e., the data from the not-to-be-modified host block(s)) will reside in the old disk sector 508 location. However, if a power failure occurs while writing the modified disk sector 508, then the data from the not-to-be-modified host block(s) will reside in the safety sector 601.

If a power failure occurred while writing the modified disk sector 508, then when a subsequent read operation is performed to read data from the location of the old disk sector, a read error would occur. In such case, the disk drive would check the safety sector 601 to see if the safety sector 601 contained the data from the not-to-be-modified host blocks by referencing the identifier (e.g., the logical block address) associated with the data, which indicates the original location of the disk sector. If the identifier matches the location of the unreadable disk sector, the data from the safety sector is written to the old disk sector location.

In addition to the steps set forth in FIG. 7, after the modified disk sector 508 has been written to the old disk sector location (block 740), the safety sector 601 may optionally be "erased." For example, the safety sector 601, may be written with an illegal logical block is address (e.g., a logical block address that does not correspond with the track associated with the safety sector). In one embodiment, the safety sectors could be "erased" by performing a background task, as will be understood to those skilled in the art. Accordingly, access times would not be affected.

While FIG. 6 only shows two safety sectors 601, 602 for a single track, it should be understood that one or two safety sectors are provided for each track. In today's disk drives, there are about 600 sectors per track. Accordingly, two safety sectors would occupy approximately 0.3% of the track, which would have an insignificant impact on the overall formatting efficiency of the track and, hence, the disk drive.

Preferably, two safety sectors are provided, since information to be written onto the disk surface may start at a point which does not require the entirety of data in the starting disk block to be overwritten and may end at a point which does not require the entirety of the data in the ending disk block to be overwritten. In such case, the first safety sector could be used to store the starting disk sector and the second safety sector could be used to store the ending disk sector.

In one embodiment, the first and second safety sectors 601,602 are offset in a manner described in U.S. patent application Ser. No. 09/590,047 filed Jun. 8, 2000, which is incorporated herein by reference in its entirety. By offsetting the safety sectors as described therein, no microjogging would be necessary when writing to the safety sectors 601, 602. Accordingly, the average number of revolutions to perform the writing and erasing of the safety sectors should decrease, as compared to a system which employs microjogging.

The read/modify/write sequence will increase the time a drive takes to write information that does not completely fill a disk block. In order to enhance performance by reducing the number of read/modify/write sequences, the first logical address should correspond to the beginning of a disk sector.

The read/modify/write technique could be simplified by eliminating block 720 (i.e., writing to a safety sector) if the disk drive system could provide adequate warning prior to power being removed. As will be understood by those skilled in the art, the warning time would have to be sufficient to cover the worst case read/modify/write duration. Furthermore, use of a battery back-up system could also permit elimination of the safety sectors.

While the invention has been described in the context of increasing formatting efficiency, it should be understood that the invention could be used to increase one or more of the formatting efficiency, the thermal asperity correction span and the allowable bit error rate.

In one embodiment, the host block is 512 bytes and the disk block is 2048 bytes (i.e., N=4). In another embodiment, the host block is 512 bytes and the disk block is 1024 bytes (i.e., N=2). Other embodiments are possible and expected.

Advantageously, no modifications are required to be made to the interface between the disk drive 100 and the host computer 102. In fact, the invention described herein is transparent to the host computer 102.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A disk drive coupled to a host computer comprising:
    an interface which delivers a plurality of host blocks from the host computer to the disk drive, each of the plurality of host blocks having a predetermined length; and,
    a data buffer which receives the plurality of host blocks, wherein the host blocks are appended to one another to form a disk block having a length, wherein the length of the disk block is equal to N times the length of each host block, where N is a natural number greater than 1, and wherein the host blocks are not compressed while being delivered from the host computer to the disk drive.

2. The disk drive of claim 1 further including a disk surface upon which the disk block is stored.

3. The disk drive of claim 1 further including an ECC field associated with the disk block.

4. The disk drive of claim 1, wherein a single ECC field corresponds with N host blocks.

5. The disk drive of claim 1, wherein a single pre-data field corresponds with N host blocks.

6. The disk drive of claim 1, wherein a single post-data field corresponds with N host blocks.

7. The disk drive of claim 1, wherein the disk block forms part of a disk sector that is stored in a data sector on a disk surface.

8. The disk drive of claim 7 further including a safety sector which stores a copy of the disk sector when a write operation is performed.

9. The disk drive of claim 8, wherein the copy of the disk sector is stored in the safety sector when less than N host sectors are to be overwritten in the disk sector.

10. The disk drive of claim 8, wherein the data sector has an address and an identifier is stored in the copy of the disk sector to identify the address of the data sector.

11. The disk drive of claim 9, wherein X host sectors are overwritten and (N−X) host sectors are not overwritten, where X is a natural number between 1 and N−1, to form a modified disk sector.

12. The disk drive of claim 11, wherein the modified disk sector is stored in the data sector.

13. The disk drive of claim 12, wherein the safety sector is erased after the modified disk sector has been stored in the data sector.

14. The disk drive of claim 13, wherein the safety sector is erased by modifying the identifier such that an illegal address for a data sector is specified.

15. The disk drive of claim 13, wherein the safety sector is erased by performing a background operation.

16. The disk drive of claim 8, wherein the safety sector is at a location on the disk surface which corresponds with a track of the data sector.

17. The disk drive of claim 16, wherein the safety sector is at a location which is offset from the track of the data sector, so as to avoid microjogging.

18. A disk drive comprising:
    a disk surface onto which a disk block is stored, the disk block having a predetermined length; and,
    a data buffer for receiving the disk block read from the disk surface and parsing the disk block into a plurality of host blocks having a predetermined length, wherein the length of the disk block is equal to N times the length of the host block, where N is a natural number greater than 1, and wherein the disk block and the plurality of host blocks are not decompressed.

19. The disk drive of claim 18 further including an interface for coupling the disk drive to a host computer, wherein data is communicated from the disk drive to the host computer via the interface in a length corresponding to that of a host block.

20. A method for storing data in a disk drive coupled to a host computer via an interface, the method comprising the steps of:

delivering a plurality of host blocks from the host computer to the disk drive via the interface, wherein each of the plurality of host blocks have a predetermined length, wherein the host blocks are not compressed while being delivered from the host computer to the disk drive; and, appending the host blocks to one another to form a disk block having a length, wherein the length of the disk block is equal to N times the length of each host block, where N is a natural number greater than 1.

21. The method of claim 20 further comprising the step of storing the disk block onto a disk surface.

22. The method of claim 20 including the step of appending an ECC field to the disk block.

23. The method of claim 20, wherein a single ECC field corresponds with N host blocks.

24. The method of claim 20, wherein a single pre-data field corresponds with N host blocks.

25. The method of claim 20, wherein a single post-data field corresponds with N host blocks.

26. The method of claim 20, wherein the disk block forms part of a disk sector that is stored in a data sector on a disk surface.

27. The method of claim 26 including the step of storing a copy of the disk sector in a safety sector when a write operation is performed.

28. The method of claim 27, wherein the copy of the disk sector is stored in the safety sector when less than N host sectors are to be overwritten in the disk sector.

29. The method of claim 27, wherein the data sector has an address and an identifier is stored in the copy of the disk sector to identify the address of the data sector.

30. The method of claim 28 including the step of forming a modified disk sector by overwriting X host sectors and not overwriting (N−X) host sectors, where X is a natural number between 1 and N−1.

31. The method of claim 30 including the step of storing the modified disk sector in the data sector.

32. The method of claim 31 including the step of erasing the safety sector after the modified disk sector has been stored in the data sector.

33. The method of claim 32, wherein the step of erasing the safety sector is performed by modifying the identifier such that an illegal address for a data sector is specified.

34. The method of claim 32 including the step of performing a background operation to erase the safety sector.

35. The method of claim 27, wherein the safety sector is at a location on the disk surface which corresponds with a track of the data sector.

36. The method of claim 35, wherein the safety sector is at a location which is offset from the track of the data sector, so as to avoid microjogging.

37. A method for storing data in a disk drive coupled to a host computer via an interface, the method comprising the steps of:

storing data on a disk surface in a disk block having a predetermined length; and, presenting data from the disk drive to the interface as a host block having a predetermined length, wherein the predetermined length of the disk block is equal to N times the predetermined length of the host block, where N is a natural number greater than 1, and wherein the host block is not decompressed.

38. A disk drive coupled to a host computer comprising:

an interface which delivers a plurality of host blocks from the host computer to the disk drive, each of the plurality of host blocks having a predetermined length;

a data buffer which receives the plurality of host blocks, wherein the host blocks are appended to one another to form a disk block having a length, wherein the length of the disk block is equal to N times the length of each host block, where N is a natural number greater than 1, and wherein the disk block forms part of a disk sector that is stored in a data sector on a disk surface; and, a safety sector which stores a copy of the disk sector when a write operation is performed, wherein the copy of the disk sector is stored in the safety sector when less than N host sectors are to be overwritten in the disk sector.

39. A disk drive coupled to a host computer comprising:

an interface which delivers a plurality of host blocks from the host computer to the disk drive, each of the plurality of host blocks having a predetermined length;

a data buffer which receives the plurality of host blocks, wherein the host blocks are appended to one another to form a disk block having a length, wherein the length of the disk block is equal to N times the length of each host block, where N is a natural number greater than 1, and wherein the disk block forms part of a disk sector that is stored in a data sector on a disk surface; and, a safety sector which stores a copy of the disk sector when a write operation is performed, wherein the data sector has an address and wherein an identifier is stored in the copy of the disk sector to identify the address of the data sector.

40. The disk drive of claim 38, wherein X host sectors are overwritten and (N−X) host sectors are not overwritten, where X is a natural number between 1 and N−1, to form a modified disk sector.

41. The disk drive of claim 40, wherein the modified disk sector is stored in the data sector.

42. The disk drive of claim 41, wherein the safety sector is erased after the modified disk sector has been stored in the data sector.

43. The disk drive of claim 42, wherein the safety sector is erased by modifying the identifier such that an illegal address for a data sector is specified.

44. The disk drive of claim 42, wherein the safety sector is erased by performing a background operation.

45. A disk drive coupled to a host computer comprising:

an interface which delivers a plurality of host blocks from the host computer to the disk drive, each of the plurality of host blocks having a predetermined length;

a data buffer which receives the plurality of host blocks, wherein the host blocks are appended to one another to form a disk block having a length, wherein the length of the disk block is equal to N times the length of each host block, where N is a natural number greater than 1, and wherein the disk block forms part of a disk sector that is stored in a data sector on a disk surface; and, a safety sector which stores a copy of the disk sector when a write operation is performed, wherein the safety sector is at a location on the disk surface which corresponds with a track of the data sector and wherein the safety sector is at a location which is offset from the track of the data sector, so as to avoid microjogging.

46. A method for storing data in a disk drive coupled to a host computer via an interface, the method comprising the steps of:

delivering a plurality of host blocks from the host computer to the disk drive via the interface, wherein each of the plurality of host blocks have a predetermined length;

appending the host blocks to one another to form a disk block having a length, wherein the length of the disk block is equal to N times the length of each host block, where N is a natural number greater than 1, wherein the disk block forms part of a disk sector that is stored in a data sector on a disk surface;

storing a copy of the disk sector in a safety sector when a write operation is performed, wherein the copy of the disk sector is stored in the safety sector when less than N host sectors are to be overwritten in the disk sector.

47. A method for storing data in a disk drive coupled to a host computer via an interface, the method comprising the steps of:

delivering a plurality of host blocks from the host computer to the disk drive via the interface, wherein each of the plurality of host blocks have a predetermined length;

appending the host blocks to one another to form a disk block having a length, wherein the length of the disk block is equal to N times the length of each host block, where N is a natural number greater than 1, wherein the disk block forms part of a disk sector that is stored in a data sector on a disk surface;

storing a copy of the disk sector in a safety sector when a write operation is performed, wherein the data sector has an address and wherein an identifier is stored in the copy of the disk sector to identify the address of the data sector.

48. The method of claim 46 including the step of forming a modified disk sector by overwriting X host sectors and not overwriting (N−X) host sectors, where X is a natural number between 1 and N−1.

49. The method of claim 48 including the step of storing the modified disk sector in the data sector.

50. The method of claim 49 including the step of erasing the safety sector after the modified disk sector has been stored in the data sector.

51. The method of claim 50, wherein the step of erasing the safety sector is performed by modifying the identifier such that an illegal address for a data sector is specified.

52. The method of claim 50 including the step of performing a background operation to erase the safety sector.

53. A method for storing data in a disk drive coupled to a host computer via an interface, the method comprising the steps of:

delivering a plurality of host blocks from the host computer to the disk drive via the interface, wherein each of the plurality of host blocks have a predetermined length;

appending the host blocks to one another to form a disk block having a length, wherein the length of the disk block is equal to N times the length of each host block, where N is a natural number greater than 1, wherein the disk block forms part of a disk sector that is stored in a data sector on a disk surface;

storing a copy of the disk sector in a safety sector when a write operation is performed, wherein the safety sector is at a location on the disk surface which corresponds with a track of the data sector and wherein the safety sector is at a location which is offset from the track of the data sector, so as to avoid microjogging.

54. A disk drive coupled to a host computer comprising:

a plurality of host blocks delivered from the host computer to the disk drive, each of the plurality of host blocks having a predetermined length, wherein the host blocks are appended to one another in the disk drive to form a disk block having a length, wherein the length of the disk block is equal to N times the length of each host block, where N is a natural number greater than 1, and wherein the host blocks are not compressed while being delivered from the host computer to the disk drive.

55. A disk drive comprising:

a disk surface onto which a disk block is stored, the disk block having a predetermined length, wherein the disk block read from the disk surface, wherein the disk block is parsed into a plurality of host blocks having a predetermined length, wherein the length of the disk block is equal to N times the length of the host block, where N is a natural number greater than 1, and wherein the disk block and the plurality of host blocks are not decompressed prior to delivery to a host computer.

56. A method for storing data in a disk drive coupled to a host computer, the method comprising the steps of:

delivering a plurality of host blocks from the host computer to the disk drive, wherein each of the plurality of host blocks has a predetermined length, wherein the host blocks are not compressed while being delivered from the host computer to the disk drive; and, appending the host blocks to one another to form a disk block having a length, wherein the length of the disk block is equal to N times the length of each host block, where N is a natural number greater than 1.

57. A method for storing data in a disk drive coupled to a host computer, the method comprising the steps of:

storing data on a disk surface in a disk block having a predetermined length; and, presenting data from the disk drive to host computer as a host block having a predetermined length, wherein the predetermined length of the disk block is equal to N times the predetermined length of the host block, where N is a natural number greater than 1, and wherein the host block is not decompressed prior to being presented to the host computer.

* * * * *